United States Patent Office 2,858,281
Patented Oct. 28, 1958

2,858,281

INSOLUBLE, ACID AND ALKALI-RESISTANT CARBOXYLIC POLYMERS

Richard G. Bauman, Bellport, N. Y., and Harold P. Brown, Akron, Ohio, assignors to The B. F. Goodrich Company, New York, N. Y., a corporation of New York No Drawing. Application January 22, 1954
Serial No. 405,659

16 Claims. (Cl. 260—2.2)

This invention relates to the polymerization of carboxylic-type monomers and particularly to the production thereby of water- and solvent-insoluble carboxylic acid type polymers which are resistant to hydrolysis.

It has been proposed heretofore to produce insoluble carboxyl-containing polymers by polymerizing a corboxylic monomer such as acrylic acid, maleic anhydride, and the like in the presence of a cross-linking agent such as divinyl benzene, diesters such as diallyl maleate, ethylene glycol dimethacrylate, diallyl or divinyl ether and others such as are disclosed in U. S. Patents 2,340,110, 2,340,111 and 2,533,635. However, the polymerization of divinyl benzene with common carboxylic monomers is so difficult to control that there are obtained, unpredictably, polymers containing relatively high proportions of soluble material and smaller proportions of overly cross-linked material. The use of the diester or divinyl ether types of cross-linking agents is attended with little difficulty as regards control, but there are obtained polymers having the serious disadvantage of being readily hydrolyzed in water and especially by the action of strong aqueous alkalis and acids such as are utilized as regenerating agents for the ion-exchange resins. This hydrolytic attack proceeds through breaking of the ester or divinyl ether cross-links and results in a great reduction in effective molecular weight and an increase in the swelling and solubles content of the polymer. For example, a maleic anhydride styrene copolymer cross-linked with 10 to 20% of divinyl ether will go into solution in water upon standing overnight with the production of a clear solution. An aqueous mucilage made from an insoluble but high-swelling acrylic acid polymer cross-linked with a low level of ester when converted to the sodium salt will steadily decrease in viscosity until the final solution resembles unmodified polyacrylic acid. Acrylic acid polymers cross-linked with triallyl cyanurate are sensitive to alkaline hydrolysis so that mucilages thereof decrease in viscosity upon neutralization. The diallyl ethers of dihydric alcohols do not effectively cross-link the carboxylic monomers, some of them functioning rather as chain transfer agents or modifying agents with the production of polymers low in molecular weight and soluble in water and many solvents.

We have discovered, however, that highly useful and highly insoluble polymers are obtained when a carboxylic monomer such as acrylic acid, maleic anhydride and others is copolymerized in the presence of a free-radical type catalyst in an organic solvent-non-solvent (solvent for monomers/non-solvent for polymer) containing a small proportion of a dissolved unsaturated polymer of an aliphatic conjugated diene. The resulting carboxyl-containing polymers are highly insoluble in water, and in most common organic solvents, and are extremely resistant to degradation by strong alkali and acids and the like. Depending on the proportion of unsaturated diene polymer utilized, however, considerable variation in polymer properties are obtained. With only 0.1 to 5% by weight of a soluble polybutadiene based on the total polymerizable material, for example, insoluble gel-like polymers are obtained which have the ability, especially in the form of their salts, to absorb large quantities of water and thereby increase in volume manyfold. Such polymers resemble, and are greatly superior to, gum tragacanth, gum Karaya and other naturally-occurring insoluble gum-like substances conventionally used as bodying, emulsifying, binding and suspending agents. When dispersed in water, oils, solvents, etc. the high swelling polymers of this invention are extremely useful in various mucilaginous or colloidal gel-like applications as bodying, emulsifying and suspending agents, illustrative applications being in tooth-pastes, surgical jellies, creams and ointments, polishing and cleaning preparations, printing paste thickeners, and as bulk laxatives, carrying agents, ion-exchange resins and other materials for use "in vivo" for the treatment of edema, as well as the usual applications of such resins and the like. Higher proportions of from 5 to 50%, more preferably 5 to 15%, produce dimensionally stable and highly insoluble carboxylic polymers admirably adapted for use as ion-exchange resins and having exceptionally high exchange capacity, which are preferably useful in treating edema.

In the production of the polymers of this invention the initial mixture contains two essential ingredients, each in certain proportions, one being a monomeric olefinically-unsaturated carboxylic acid or carboxyl forming substance such as acrylic acid, methacrylic acid, maleic anhydride, sorbic acid and the like and the other being a soluble polymer of an aliphatic conjugated diene. Other monomeric materials may be present, even in fairly large proportions as will be more fully defined hereinafter, with the production of highly useful, water-insoluble, hydrolysis-resistant carboxylic-type polymers useful for a great variety of applications ranging from gelatinous or mucilaginous dispersions to dimensionally-stable, hard ion-exchange resins.

The carboxylic monomers useful in the production of the polymers of this invention are the olefinically-sunsaturated carboxylic acids containing at least one activated carbon-to-carbon olefinic double bond, and at least one carboxyl group, that is, an acid containing an olefinic double bond which readily functions in addition polymerization because of its presence in the monomer molecule either in the alpha-beta position with respect to a carboxyl group thusly

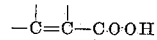

or as a part of a terminal methylene grouping thusly $CH_2=C<$. In the alpha-beta unsaturated acids the close proximity of the strongly polar carboxyl group is believed to greatly activate the double-bonded carbon atoms and render the substances containing this structure very readily polymerizable. Likewise, the presence of the terminal methylene grouping in a carboxylic monomer makes this type of compound much more easily polymerizable than if the double bond were intermediate in the carbon chain. Acids within this broad class include such widely divergent materials as the acrylic acids such as acrylic acid itself, methacrylic acid, alpha-chloro acrylic acid, alpha-phenyl acrylic acid, and others, crotonic acid, beta-acryloxy propionic acid, hydrosorbic acid, sorbic acid, alpha-chloro sorbic acid, cinnamic acid, beta-styryl arcrylic acid, muconic acid, glutaconic acid, itaconic acid, citraconic acid, mesaconic acid and others. As used herein, the term "carboxylic acid" includes the polycarboxylic acids and their anhydrides, such as maleic anhydride, wherein the anhydride group is formed by the elimination of one molecule of water from two carboxyl groups located on the same molecule of acid. Anhydrides formed by elimination of water from two or more molecules of the same or different unsaturated acids, such as acrylic anhydride, are not included because of the tendency of their polymers to hydrolyze in water and aqueous alkali.

Better results are obtained utilizing as the carboxylic monomer one or more alpha-beta unsaturated carboxylic acids containing at least one carboxyl group, with the olefinic double bond alpha-beta to at least one carboxyl group. Illustrative acids of this preferred sub-class include the acrylic acids disclosed above and in addition beta-methyl acrylic acid, beta-phenyl acrylic acid, and others, crotonic acid, hydrosorbic acid, alpha-butyl crotonic acid, angelic acid, cinnamic acid, m-chloro cinnamic acid, p-chloro cinnamic acid, umbellic acid, and other monoolefinic monocarboxylic acids; fumaric acid, hydromuconic acid, glutaconic acid, itaconic acid, citraconic acid, mesaconic acid, and other monoolefinic di- and polycarboxylic acids; sorbic acid, beta-acryloxy acrylic acid, beta-styryl acrylic acid (4-phenyl-1-carboxy butadiene-1,3), and other polyolefinic monocarboxylic acids; 3-carboxy-pentadiene- (2,4)-oic-1, muconic acid, and other polyolefinic polycarboxylic acids; and maleic anhydride and other acid anhydrides having the general structure

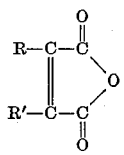

wherein R and R' are selected from the group consisting of hydrogen, halogen, cyanogen (—C≡N), hydroxyl, lactam and lactone groups, and alkyl, aryl, alkaryl, aralkyl, and cycloalkyl groups such as methyl, ethyl, propyl, octyl, decyl, phenyl, tolyl, xylyl, benzyl, cyclohexyl and the like; and others. Preferred alpha-beta unsaturated acids are acrylic acid and maleic anhydride.

The preferred carboxylic monomers for use in this invention are the monoolefinic acrylic acids having the general structure

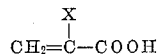

wherein X is a substituent selected from the class consisting of hydrogen, halogen, hydroxyl, carboxyl, amide, ester, lactone, lactam and the cyanogen (—C≡N) groups, and monovalent alkyl radicals, aryl radicals, alkaryl radicals, aralkyl radicals, and cycloaliphatic radicals. Illustrative acrylic acids of this preferred class are acrylic acid itself, methacrylic acid, ethacrylic acid, alpha-chloro acrylic acid, alpha-bromo acrylic acid, alpha-cyano acrylic acid, alpha-phenyl acrylic acid, alpha-benzyl acrylic acid, alpha-cyclohexyl acrylic acid, and others. The alpha-halo and alpha-cyano acrylic acids readily hydrolyze at the halogen or cyano substitution with the formation of hydroxyl (or lactone) and a second carboxyl group. Of this preferred class acrylic acid itself is most preferred because of its generally lower cost, ready availability, and ability to form superior polymers.

The cross-linking agent utilized in this invention to confer insolubility on the otherwise generally soluble carboxylic acid polymers may be any organic solvent soluble polymer of an aliphatic conjugated diene which contains a substantial amount of unsaturation, that is, polymers made from monomeric mixtures containing 50% or more of a diene hydrocarbon. The residual unsaturation of these polymers, especially when it is present as side chain vinyl units thusly

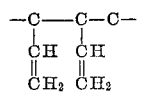

is believed to be responsible for the reaction with the carboxylic monomers. Double bonds intermediate of the diene polymer structure, or active methylenic hydrogens of the main diene polymer chain, may be involved in the reaction, although less probable than residual vinyl groups. Whichever mechanism is involved, there is formed a three-dimensional network of long chains of carboxylic monomer units tied together with diene polymer chains. The carbon-to-carbon linkages established by this novel type of polymerization are exceedingly resistant to hydrolysis and other forms of chemical attack. As stated above the only critical characteristics for the diene polymer or polymeric cross-linking agent is that it be soluble in common organic solvents and contain greater than 50% diene units.

A preferred class of polymeric cross-linking agent is the soluble polymers of butadiene-1,3 hydrocarbons, that is, of butadiene-1,3 itself, isoprene, piperylene, 1,2-dimethyl butadiene, and others, which are made from monomeric mixtures containing a substantial proportion of diene, preferably more than 50% of a diene hydrocarbon. A preferred class of these polymers may contain up to 50% of styrene, acrylonitrile, methyl methacrylate, methyl acrylate, acrylic acid, methacrylic acid, vinylidene chloride, vinyl pyridine, and other monoolefinic monomers. Of this class polybutadiene is most preferred because of its potentially greater degree of unsaturation and greater solubility in common solvents.

The polymeric cross-linking agents described above may be made in any manner adapted to produce soluble polymers. For example, the monomers may be polymerized in mass, in solution, or in aqueous emulsion. Polymerization in a proper organic solvent yields a solution utilizable per se in the subsequent polymerization with the carboxylic monomer. Polymerization in emulsion is easily carried out with well-known techniques such as proper modification, etc. to yield soluble polymers. Most preferred, however, is polymerization in an inert organic solvent, preferably an aliphatic hydrocarbon solvent, in the presence of an alkali metal catalyst. Such a polymerization yields a polymer characterized by a much higher percentage of 1,2-addition (up to 80%) than 1,4-addition. The product will contain a higher proportion of side-chain vinyl groups and, therefore, will have a higher cross-linking efficiency than the more conventional solution and emulsion polymerized polymers produced with so-called "free-radical" catalysts, which have internal carbon-to-carbon double bonds resulting from up to 70 to 80% of 1,4-addition.

The preferred alkali-metal polymerization of conjugated aliphatic diene hydrocarbons is well known and is carried out using a finely-divided alkali-metal usually dispersed in a hydrocarbon such as petrolatum. A preferred catalyst has a moist, sand-like consistency and appearance. The diene hydrocarbon is first added to liquid butane, pentane, hexane, heptane, benzene, toluene, and other hydrocarbons, including the chloro-hydrocarbons, such as chlorobenzene or carbon tetrachloride followed by addition of the alkali-metal. Modifiers may be employed in a conventional manner to control the reaction characteristics and produce more uniform polymers. For this purpose there may be utilized aldehydes, ketones, esters, ethers, acids, nitriles, acetylenes, water, alcohols, certain other olefins, primary and secondary amines, and many others. Benzyl and hydroxy-ethers in amounts of 0.05 to 2% or more are particularly effective modifiers for producing low-molecular weight soluble polymers, their use in a particularly satisfactory method of alkali-metal polymerization being more fully described in the copending application of Leonard C. Kreider, Serial No. 267,305, filed January 17, 1952. Polymerizations of this type are carried out at from 30° C. to 100° C., more preferably 50° C.±10° C., in the absence of air or moisture.

The reaction mixture can contain, in addition to the carboxylic monomer, diene polymer, solvent and free-radical catalyst, varying proportions of other monoolefinic monomers copolymerizable with the carboxylic monomer. For example highly useful polymers of acrylic acid may be prepared where acrylamide, N-methyl acrylamide, vinyl methyl ether, and other hydrophilic monomers, that is monomers which homopolymerize to water-sensitive or water-soluble polymers, can be substituted for a substantial proportion of the acid, preferably not more than an equimolar quantity. Hydrophobic monomers such as styrene, acrylonitrile, methylmethacrylate, vinyl acetate, and others. In other words monomers which homopolymerize to water-insoluble and water-insensitive polymers, can be substituted for acrylic acid to the extent of 50%, on a molar basis with respect to the hydrophilic polymer producing monomer. With maleic anhydride, a monomer which evidences a strong tendency to form alternating polymers with most monomers, it is preferred that there be present sufficient of a second monoolefinic monomer in addition to the polymeric cross-linking agent to form the alternating type polymers. For example 62.8 parts by weight of maleic anhydride combines very readily with 37.2 parts of vinyl methyl ether in the presence of 0.1 to 15% of low molecular-weight Na-catalyzed polybutadiene to form insoluble, hydrolysis-resistant polymers of excellent properties.

The polymerization of the carboxylic monomer in the presence of the dissolved polymeric cross-linking agent is carried out in solution in an inert solvent, preferably a non-polymerizing hydrocarbon solvent, having solvating action on the carboxylic monomer and other monomers and also on the polymeric cross-linking agent, but which has little appreciable solvent or swelling action on the cross-linked carboxylic polymer produced. In this way the polymer is obtained in a fine, granular condition which requires only to be freed of solvent, and seldom requires grinding, before use. An organic solvent-soluble catalyst is necessary. Any of the organic free-radical catalysts is satisfactory. Among these are the various organic solvent-soluble peroxygen compounds including benzoyl peroxide, o,o'-dichlorobenzoyl peroxide, caprylyl peroxide, pelargonyl peroxide, acetyl benzoyl peroxide, and others, azoisobutyronitrile, and many others. The polymerization is carried out at 0° C to 100° C., more preferably 25° C. to 90° C., and in the absence of air.

The following specific examples, which are intended as illustrative only, will more clearly demonstrate the preparation of insoluble, hydrolysis-resistant carboxylic polymers using various carboxylic monomers and various diene polymers as cross-linking agents.

*Example 1*

A polymeric cross-linking agent for use in the present invention is prepared by heating the following materials at 50° C.:

A

| Material | Parts/wt. |
|---|---|
| Butadiene | 100.0 |
| n-pentane | 100.0 |
| Na-catalyst: | |
| Na-metal | 0.15 |
| Petrolatum | 2.00 |
| Dibenzyl ether modifier | 0.20 |

The product of this polymerization at conversions of 74 to 87% is a solution of low molecular weight polybutadiene (degree of polymerization from 5 to 10) in pentane showing 70 to 80% 1,2-addition. The pentane solution of polybutadiene is utilized in the preparation of insoluble acrylic acid polymers by reacting the polybutadiene described above with an unsaturated acid in the following proportions:

A hydrophilic water-insoluble polymer is formed by reacting the polybutadiene of A above with an unsaturated acid monomer, as shown below:

| Material | Parts/Wt. | | |
|---|---|---|---|
| | I | II | III |
| Acrylic acid | 48.1 | 75.0 | 95.8 |
| Polybutadiene | 51.9 | 25.0 | 4.2 |
| Pentane | 99.5 | 99.5 | 97.5 |
| Azoisobutyronitrile | 1.0 | 1.0 | 1.0 |

The mixtures are heated in a water bath at 50° C., the polymerization being essentially complete in 3 hours. The polymer is isolated and extracted with water and benzene to determine the amount of polybutadiene and acrylic acid reacted. Any unreacted polybutadiene would be soluble in benzene and any unreacted or homopolymerized acrylic acid would be soluble in water. All three polymers are substantially insoluble as is shown below:

| Polymer No. | Percent Soluble | |
|---|---|---|
| | Benzene | Water |
| I | .4 | 3 |
| II | .2 | 1 |
| III | .0 | 5 |

In contrast, copolymers of acrylic acid and up to 10 to 20% of a cross-linking agent such as divinyl benzene, ethylene glycol dimethacrylate, diallyl maleate, etc. frequently contain 10 to 50% by weight of water-soluble material. Polymer No. I above is a good adhesive for glass, polymer No. II is an excellent dimensionally-stable cation exchange resin and polymer No. III is a high-swelling polymer well adapted for use as a high yield point bodying agent in mucilaginous applications.

*Example 2*

A series of insoluble, cross-linked polymers are prepared by copolymerizing acrylic acid and low molecular weight polybutadiene (described in Ex. I) in hexane at 50° C. The materials used are as follows:

| Material | Parts/Wt. | |
|---|---|---|
| | IV | V |
| Acrylic acid | 85.0 | 95.0 |
| Polybutadiene | 15.0 | 5.0 |
| Azoisobutyronitrile | 1.06 | 1.00 |
| Hexane | 1000.00 | 100.00 |

The polymerization in each case occurs smoothly with the formation of a polymer slurry. The slurry in each case is filtered and the polymer dried to obtain fine, white, powdery polymers which are water-insoluble and low-swelling. They are evaluated as ion exchange resins and found to have the following properties:

| Polymer No. | Capacity (Me. (Na)/gm.) | Swelling Index [1] Intestinal Juice |
|---|---|---|
| IV | 11.4 | 12 |
| V | 12.1 | 21 |
| Control | 11.7 | 21.5 |

[1] Ratio of weight of swollen polymer/gm. of dry polymer.

*Example 3*

Other forms of polybutadiene may be utilized as cross-linking agents for acrylic acid. Copolymers are prepared using 5% on the total polymerizable material of, respectively, (1) a high molecular weight rubbery Na-catalyzed polymerized polybutadiene having a Mooney viscosity of 44 after 4 minutes at 212° F. using a 1.500 inch rotor and (2) of a high molecular weight rubbery polybutadiene made in aqueous emulsion using a laurylamine hydrochloride cationic emulsifier and having a 1.200 inch rotor Mooney of 40, 0% gel and an intrinsic viscosity of 2.39. Stock solutions of the polybutadiene polymers in cyclohexane are first made up, fifty grams of the Na-catalyzed polymer of polybutadiene being dissolved in 975 gms. of cyclohexane and 50 grams of the emulsion-polybutadiene being dissolved in 650 grams of cyclohexane. Aliquot portions of these solutions are first added to hexane (or benzene) and the acrylic acid then added along with catalyst according to the following proportions:

| Material | Parts/Wt. | | | |
|---|---|---|---|---|
| | Control | VI | VII | VIII |
| Acrylic acid | 47.5 | 47.5 | 47.5 | 47.5 |
| Low Mol. Wt. Na-polybutadiene | 2.5 | | | |
| High Mol. Wt. Na-polybutadiene | | 2.5 | | 2.5 |
| Emulsion Polybutadiene (Med. Mol. Wt.) | | | 2.5 | |
| Hexane (cc.) | 500 | 200 | 200 | |
| Benzene | | | | 319 |
| Azoisobutyronitrile | 0.5 | 0.5 | 0.5 | 0.5 |

The polymerization in all cases proceeds smoothly at 50° C. to substantial completion in 3 to 5 hours. The product in each case is a fine polymer slurry from which fine, white, fractile and powdery polymers are easily isolated. The polymers are evaluated as ion-exchange resins and found to have the following properties:

| Polymer No. | Control | VI | VII | VIII |
|---|---|---|---|---|
| Swelling index (intestinal juice) | 22 | 30 | 36 | 43 |
| Percent Soluble (H₂O) | 5.9 | 7.25 | 11.0 | 10.82 |
| Capacity (me./gram) | 12.1 | 13.3 | 13.2 | 12.9 |

It is seen that all forms of polybutadiene are efficient cross-linking agents for acrylic acid. They are seen to be at least as efficient as the diester, diether, and divinyl hydrocarbon types of commonly used cross-linking agents since solubles contents range from 7 to 11%. The cation exchange capacities shown above for the four polymers are from 1.0 to 2.0 me./grm. higher than those of commercially available carboxylic ion-exchange resins. Of the four polymers made in Example 3, those made with sodium metal catalyzed polybutadiene (control and polymer VI) are seen to be superior as regards percent solubles (which is a more reliable index of cross-linking distribution than swelling index). This superiority over emulsion-produced polybutadiene is believed due to the relatively higher proportion of side-chain vinyl groups derived from the 1,2-type of addition obtained with the alkali-metal catalysts than from the predominant head-to-tail or 1,4-addition obtained with the peroxygen catalysts in aqueous emulsion. The superiority as a cross-linking agent noted in Example 3 for the low molecular weight Na-polybutadiene over higher molecular weight Na-polybutadiene is not understood but may be due to the higher mobility of the shorter polybutadiene chains in solution making possible the more efficient utilization of the sidechain vinyl groups. All four polymers shown in Example 3 are more clearly superior in their resistance to strong alkali and acids than are diester-, divinyl ether or diallyl ether cross-linked acrylic acid copolymers.

Example 4

Maleic anhydride may be utilized as the carboxylic monomer. This monomer ordinarily has a strong tendency to form alternating polymers with vinyl-type monomers. Maleic anhydride 23.55 grams, 4.7 grams of the emulsion-polymerized polybutadiene of Example 3, and 5 grams of benzoyl peroxide are dissolved in 600 grams of benzene and the mixture heated at 50° C. A buff colored resinous material separates from solution which is found to have a melting point above 233° C. The product is found to have an anhydrous cationic capacity of 12.57 me./gm. The water-solubles are extracted (unreacted maleic anhydride) and the cationic capacity of the residual extracted polymer determined to be 11.01 me./gm., a capacity approximating that which would result from the combination of 1 unit of maleic anhydride with one unit of butadiene (i. e. 11.7 me./gm.). This polymer, moreover, has an extremely low swelling index of 5.

Example 5

Other butadiene polymers such as the copolymers of dienes with styrene, acrylonitrile, chloroprene, isobutylene and others may be utilized as cross-linking agents for acrylic acid, methacrylic acid, and/or maleic anhydride and others. One such polymer is prepared by heating a mixture containing 100 grams of anhydrous acrylic acid in 400 grams of benzene, 100 grams of a 5% solution of a butadiene-styrene copolymer known as "GRS" and made in emulsion from a monomeric mixture of 70–75% butadiene and 25–30% styrene, and 15 grams of benzoyl peroxide at 50° C. for about 20 hours. A quantitative yield of polymer is obtained having an anhydrous cationic capacity of 12.46 me./gm. Another such polymer is prepared by reacting at 50° C. a mixture of 50 grams of maleic anhydride (a large excess) dissolved in 475 grams of benzene, 100 grams of a 5% solution of the same "GRS" copolymer in benzene, and 10 grams of benzoyl peroxide. A polymer is obtained having an anhydrous cationic capacity of 12.88 me./gm. A copolymer of methacrylic acid and 5% of the low molecular weight Na-polybutadiene (Example 1) contains less soluble material than corresponding acrylic acid polymers shown in the foregoing examples.

Example 6

The use of larger amounts of emulsion-produced medium molecular weight polybutadiene produces copolymers of low solubles content yet which possess high cationic exchange capacity (the more of any cross-linking agent the lower the capacity). For example, 100 grams of anhydrous acrylic acid in 500 grams of anhydrous benzene are mixed with 200 grams of a 5% solution of medium molecular weight emulsion-polymerized polybutadiene (10% of total polymerizable material) and 1 gram of azoisobutyronitrile and then heated overnight in a water bath at 50° C. A quantitative yield of a white, powdery polymer is obtained which is found to have a swelling index of only 17 in intestinal juice and an anhydrous cationic capacity of 12.9 me. of sodium/gram. This polymer, which is superior to most commercially available carboxylic ion-exchange resins in total cation exchange capacity, is ideally adapted, when sterilized, for use by oral administration in "in vivo" ion exchange in the treatment of edema. Its extreme resistance to hydrolysis and low dimensional change in intestinal juice makes it resistant to breakdown by chemical action or enzymatic attack in the gastro-intestinal tract.

Example 7

The foregoing examples have demonstrated the preparation of ion-exchange resins cross-linked with 4 to 50% or more of diene polymer and which are noted for their dimensional stability. High-swelling polymers, however, which ideally adapt as synthetic gum-like materials, are produced when the amount of diene polymer is reduced to 0.1 to 5%. Such high-swelling polymers are useful in mucilaginous applications such as thickening or bodying agents in printing pastes, latex hydrogels, toothpastes, surgical and pharmaceutical jellies, and the like. The preparation of mucilaginous compositions from insoluble but water-sensitive polymers of acrylic acid or other carboxylic monomers are disclosed in the copending application of Joseph F. Ackerman and John F. Jones, Serial No. 406,058, filed January 25, 1954, and in the copending application of Harold P. Brown, Serial No. 307,711, filed September 3, 1952. The latter application describes the preparation of insoluble high-swelling carboxylic polymers by the use of polyalkenyl polyethers of certain polyhydric alcohols such as the polyallyl polyether of sucrose containing 6 allyl groups per sucrose molecule. In the description which is to follow an acrylic acid polymer cross-linked with polyallyl sucrose is given as a control.

Acrylic acid is copolymerized at 50° C. utilizing reaction mixtures of composition as follows:

| Material | Parts/Wt. | |
| --- | --- | --- |
| | A [1] | B |
| Acrylic acid (anhydrous) | 98.5 | 98.5 |
| Polyallyl polyether of sucrose | 1.5 | |
| Polybutadiene (low mol. wt. Na-polymerized of Ex. 1) | | 1.5 |
| Azoisobutyronitrile | 0.75 | 0.75 |
| Hexane | 500 | 500 |

[1] Control polymer of the type disclosed in the copending application of Harold P. Brown, Serial No. 307,711, filed September 3, 1952.

The polymer in each case is obtained as a fine slurry which is filtered to remove the polymer. The solvent-free polymers (acid or "H" form) exhibit swelling indices of (A) 32 and (B) 38. When the polymers are placed in water containing sufficient sodium hydroxide to neutralize 75% of the carboxyl group of the polymer, a pronounced swelling takes place in each case, such that the polymer is converted to an almost clear gel. The 75% sodium salt has an estimated swelling index in distilled water of 2 to 4 times that of the unneutralized polymer. When sufficient water is added to each polymer salt gel to produce a final composition containing but 1% of the polymer salt and the resulting aqueous mixture ground by hand in a mortar a thick, very viscous and creamy mucilaginous composition having a high yield point is obtained. The viscosities of the two mucilages, as determined on the Interchemical viscometer, are as follows:

| Polymer | Viscosity, centipoises | Yield Point, dynes/cm.$^2$ |
| --- | --- | --- |
| B | 698 | 1,220 |
| A | 195 | 235 |

Thus, the low molecular weight Na-catalyzed polybutadiene is at least as efficient a cross-linking agent for acrylic acid as hexaallyl sucrose. The high viscosity and high yield point of polymer B is significant because it adapts the polymer for use as a printing paste thickener in the production of unique water dispersions of insoluble color pigments containing little or no volatile solvents or oils which produce clearer, sharper detail in the printed or decorated textile. Moreover, the use of the ammonium salt of the insoluble polymer results in greater permanence and fastness of the printed textile due to the further cross-linking caused by the formation of diamide or diimide linkages upon the application of heat. The high-swelling forms of these polymers find application as thickeners or bodying agents for synthetic rubber or resin latices, only a small amount of the polymer or its salt being required to convert the latex to a unique thick, creamy hydrogel useful in coating, impregnating, and allied uses.

While there have been disclosed with considerable detail certain preferred manners of performing this invention, it is not intended or desired to be solely limited thereto, for as hitherto stated the procedure may be modified, the precise proportions of the materials utilized may be varied, and other materials having equivalent properties may be employed if desired without departing from the spirit and scope of the invention as defined in the appended claims.

We claim:

1. Insoluble, acid and alkali-resistant, cross-linked, carboxyl-containing resins having a plurality of carboxyl groups comprising the reaction products of (A) a member of the group consisting of (1) acrylic acid, (2) methacrylic acid, (3) an equimolar mixture of maleic anhydride and methyl vinyl ether and (4) an equimolar mixture of maleic acid and methyl vinyl ether and (B) 0.1 to 15% by weight based on the total reacting materials of a hydrocarbon soluble, alkali metal-catalyzed homopolymer of a butadiene-1,3, said carboxyl-containing resins being swellable and capable of absorbing at least 11 times their weight of water.

2. Insoluble, acid and alkali-resistant, cross-linked carboxyl-containing resins comprising the reaction products of methacrylic acid and .1 to 15% by weight based on the total reacting materials of a hydrocarbon-soluble, alkali metal-catalyzed homopolymer of butadiene-1,3, said carboxyl-containing resins being swellable and capable of absorbing at least 11 times their weight of water.

3. Insoluble, acid and alkali-resistant, cross-linked carboxyl-containing resins comprising the reaction products of (1) an equimolar mixture of maleic acid and methyl vinyl ether, and (2) 0.1 to 15% by weight based on the total reacting materials of a hydrocarbon-soluble, alkali metal-catalyzed homopolymer of butadiene-1,3, said carboxyl-containing resins being swellable and capable of absorbing at least 11 times their weight of water.

4. Insoluble, acid and alkali-resistant, cross-linked carboxyl-containing resins comprising the reaction products of acrylic acid, and 0.1 to 15% by weight based on the total reacting materials of a hydrocarbon-soluble, alkali metal-catalyzed homopolymer of butadiene-1,3, said carboxyl-containing resins being swellable and capable of absorbing at least 11 times their weight of water.

5. Insoluble, acid and alkali-resistant, cross-linked carboxyl-containing resins comprising the reaction products of (1) an equimolar mixture of maleic anhydride and methyl vinyl ether and (2) 0.1 to 15% by weight based on the total reacting materials of a hydrocarbon-soluble, alkali metal-catalyzed homopolymer of butadiene-1,3, said carboxyl-containing resins being swellable and capable of absorbing at least 11 times their weight of water.

6. Insoluble, acid and alkali-resistant, cross-linked carboxyl-containing resins comprising the reaction products of acrylic acid and 5 to 15% by weight based on the total reacting materials of a hydrocarbon-soluble, low molecular weight alkali metal-catalyzed homopolymer of butadiene-1,3 said carboxyl-containing resins being swellable and capable of absorbing at least 11 times their weight of water.

7. Insoluble, acid and alkali-resistant, cross-linked, carboxyl-containing resins comprising the reaction products of (A) a member of the group consisting of (1) acrylic acid, (2) methacrylic acid, (3) an equimolar mixture of maleic acid and methyl vinyl ether and (4) an equimolar mixture of maleic acid and methyl vinyl ether and (B) 0.1 to 5% by weight based on the total reacting materials of a hydrocarbon-soluble, alkali metal-catalyzed homopolymer of butadiene-1,3, said carboxyl-containing resins being swellable and capable of absorbing at least 11 times their weight of water.

8. Insoluble, acid and alkali-resistant, cross-linked carboxyl-containing resins comprising the reaction products of acrylic acid and 0.1 to 5% by weight based on the total reacting materials of a hydrocarbon-soluble, low molecular weight sodium metal-catalyzed homopolymer of butadiene-1,3, said carboxyl-containing resins being swellable and capable of absorbing at least 11 times their weight of water.

9. Insoluble, acid and alkali resistant, carboxyl-containing resins comprising the reaction products of (1) an equimolar mixture of maleic anhydride and methyl vinyl ether and (2) 0.1 to 5% by weight based on the total reacting materials of a hydrocarbon-soluble, low molecular weight sodium-catalyzed homopolymer of butadiene-1,3, said carboxyl-containing resins being swellable and capable of absorbing at least 11 times their weight of water.

10. The method of producing insoluble, cross-linked, carboxyl-containing resins which comprises forming a solution of (A) a member of the group consisting of (1) acrylic acid, (2) methacrylic acid, (3) an equimolar mixture of maleic anhydride and methyl vinyl ether, and (4) an equimolar mixture of maleic acid and methyl vinyl ether and (B) from 0.1 to 15% by weight based on the total reacting materials of a hydrocarbon-soluble, alkali metal-catalyzed homopolymer of butadiene-1,3, in an inert solvent having substantially no swelling action on the resulting carboxyl-containing resins, adding an organic solvent-soluble free-radical polymerization catalyst and heating the resulting solution at a temperature of 25 to 100° C., the resulting carboxyl-containing resins being swellable and capable of absorbing at least 11 times their weight of water.

11. The method of claim 10 in which methacrylic acid is copolymerized with the homopolymer of butadiene-1,3.

12. The method of claim 10 in which hexane is the inert hydrocarbon solvent.

13. The method of claim 10 in which benzene is the inert hydrocarbon solvent.

14. The method of producing insoluble, cross-linked, carboxyl-containing resins which comprises forming a solution of (A) a member of the group consisting of (1) acrylic acid, (2) methacrylic acid, (3) an equimolar mixture of maleic anhydride and methyl vinyl ether and an equimolar mixture of maleic acid and methyl vinyl ether and (B) from about .1 to about 5% by weight based on the total reacting material of a hydrocarbon-soluble, alkali metal-catalyzed homopolymer of butadiene-1,3, in an inert hydrocarbon solvent having substantially no swelling action on the resulting resin, adding a solvent-soluble free-radical polymerization catalyst and heating the resulting solution at a temperature of 25 to 100° C., the resulting carboxyl-containing resins being swellable and capable of absorbing at least 11 times their weight of water.

15. The method of producing insoluble, cross-linked, carboxyl-containing resin which comprises dissolving acrylic acid and from 0.1 to 15% by weight based on the total reacting materials of a hydrocarbon-soluble, alkali metal-catalyzed homopolymer of a butadiene-1,3 in an inert hydrocarbon solvent having substantially no swelling action on the resulting carboxyl-containing resins, adding a hydrocarbon-soluble free-radical polymerization catalyst and heating the resulting solution at a temperature of 25 to 100° C., the resulting carboxyl-containing resins being swellable and capable of absorbing at least 11 times their weight of water.

16. The method of producing insoluble, cross-linked, carboxyl-containing resins which comprises forming a solution of a substantially equimolar mixture of maleic anhydride and methyl vinyl ether and 0.1 to 15% by weight on the total reacting material of a hydrocarbon-soluble, alkali metal-catalyzed homopolymer of butadiene-1,3 in an inert hydrocarbon solvent having substantially no swelling action on the resulting carboxyl-containing resins, adding a hydrocarbon-soluble free-radical polymerization catalyst and heating the resulting solution at a temperature of 25 to 100° C., the resulting carboxyl-containing resins being swellable and capable of absorbing at least 11 times their weight of water.

References Cited in the file of this patent

UNITED STATES PATENTS

| | | |
|---|---|---|
| 2,142,980 | Huijser | Jan. 3, 1939 |
| 2,275,951 | Farmer | Mar. 10, 1942 |
| 2,634,256 | Sparks et al. | Apr. 7, 1953 |

FOREIGN PATENTS

| | | |
|---|---|---|
| 679,562 | Great Britain | Sept. 17, 1952 |